UNITED STATES PATENT OFFICE 2,321,472

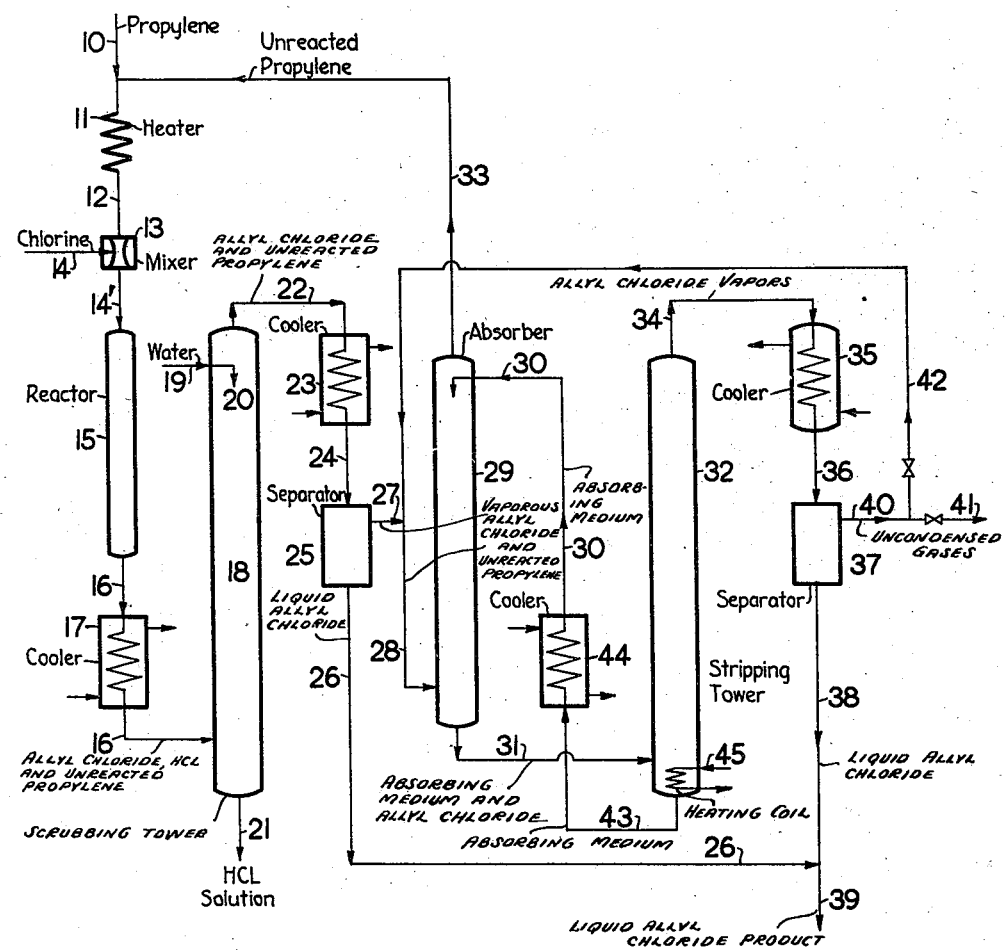

PROCESS FOR PRODUCING AND RECOVERING HALOGENATED ORGANIC COMPOUNDS

William Engs and Simon N. Wik, Berkeley, Calif., assignors to Shell Development Company, San Francisco, Calif., a corporation of Delaware Application May 29, 1939, Serial No. 276,376

11 Claims. (Cl. 260—654)

The present invention relates to processes dealing with halogenation of organic compounds, and more particularly pertains to improvements for effecting the production on an industrially practical scale of products of halogenation, via substitution, of unsaturated organic compounds. In one of its specific embodiments the invention covers a practical and economical process for obtaining products of halogenation, by allylic halo-substitution, of unsaturated organic compounds of the class of the unsaturated hydrocarbons. The invention further includes a novel method of recovering the products of such allylic halo-substitution of unsaturated hydrocarbons, such as olefins, whereby great flexibility, ease of control, and marked economy are attainable, while eliminating, or at least greatly reducing the undesirable side reactions which usually accompany such halogenation by substitution.

Recently, it has been proposed to effect such halo-substitution at an elevated temperature. Briefly stated, this process comprises subjecting an unsaturated organic compound of the above-identified class to a halogenation reaction in the presence or in the absence of a halogenation catalyst, at an elevated temperature at which allylic halogen substitution takes place but below the temperature at which substantial degradation, such as cracking, splitting out of a hydrogen halide, polymerization, etc., of the organic reactant and/or product occurs. A detailed description will be found in the United States Patent No. 2,130,084.

Halogens may react with most organic compounds, especially unsaturated organic compounds, in a number of different ways. In fact, even when the conditions of reaction are adjusted so that one type of reaction, such as, for example, halo-substitution, is desired and substantially favored over halogen addition or over other types of reaction, it is nevertheless difficult to obtain high yields of the desired individual products because of the formation of higher substitution products unless the organic compound used as the starting material is present in substantial excess of the stoichiometric requirement for reaction with the halogen. Obviously, such use of excessive quantities of the organic compounds greatly reduces the yield of the desired halo-substitution products as based on the quantity of organic compounds employed. Furthermore, the halogen substitution reaction concurrently produces a halogen acid. Therefore, even if the unsaturated organic compound were to be used in quantities in excess of the stoichiometric requirement for reaction with the halogen, thus decreasing the formation of some of the undesirable side-reaction products, it is still impossible to obtain commerically practical and high yields of certain of the desired halo-substitution product (such as methyl allyl chloride) due to reaction between the excess starting material and the above-mentioned halogen acid formed during the substitution reaction. Besides other types of by-products formed during the halo-substitution reaction, a loss in yield of the desired halogen substituted product may also result from the reaction of such product with the halogen acid formed in situ, particularly by the action of the halogen acid on the tertiary carbon atom of the halo-substituted unsaturated organic product.

In order to prevent, or at least greatly inhibit such undesirable side reactions, it has recently been proposed to "quench" the secondary reactions by means of water or a like solvent for the halogen acid formed. This halogen acid solvent is preferably one which is immiscible both with the organic compound being treated and with the desired halogen substituted product. In order to obtain optimum results, the halogen and the organic compound under treatment are conveyed, at the desired elevated temperature, through the reaction zone, and are then brought directly into contact with the halogen acid solvent, such as water, so as to separate the halogen acid from further contact with the unsubstituted starting material. Simultaneously, the halogen acid is diluted by such solvent to such a degree that it is substantially incapable of reacting with the desired substituted product. A detailed description will be found in U. S. Patent No. 2,077,382.

As will be pointed out below, the efficient and economic formation of most olefine halo-substituted products and particularly of unsaturated monohalogen substituted products, necessitates operations with an excess of unsaturated compound over the stoichiometric requirement for reaction with the available halogen. Therefore, the resulting substance leaving the reaction zone contains considerable proportions of unreacted and unsubstituted starting material which may be effectively reused, if separated, for the production of new quantities of the desired halo-substituted product. Therefore, it was always necessary to recover the products of reaction from the unsubstituted starting material either during or after the halogen acid separation step. According to the known methods of operation such halo-substituted products were usually separated by cooling the mixture to their liquefaction temperatures. When relatively higher boiling starting materials are subjected to the above-outlined halo-substitution, the fractional separation of the substituted reaction product from the unreacted material may be accomplished comparatively economically by such refrigeration. However, when dealing with relatively low boiling unsaturates such as propylene, and with the corresponding monohalogen substitution product, i. e. allyl halide, and when it is noted that the proportion of such allyl halide in the products leaving the reaction zone is relatively small, it would be necessary to resort to excessive refrigeration and fractionation in order to quantitatively recover such allyl halide. For example, chilling to temperatures in the order of —30° C. would be essential to liquefy fairly quantitatively allyl chloride from mixtures thereof with propylene. Obviously, such refrigeration is costly, thus frequently rendering the process commercially uneconomical.

It is therefore the main object of the present invention to avoid the above and other defects and to provide a process for the economical and commercially practical recovery or separation of halo-substituted products from a mixture resulting from the action of a halogen on unsaturated organic compounds It is a further object to efficiently and economically manufacture and separate unsaturated organic halides, and particularly the unsaturated halogen substituted organic compounds, from the unreacted unsaturated organic compounds.

It has now been discovered that these and other objects may be attained by treating the products of reaction, preferably after the removal of the halogen acid, with a solvent having preferential solubility for the halo-substituted products. It has been further discovered that petroleum hydrocarbons, both saturated and unsaturated, and of various boiling points and/or ranges, have solvent characteristics for the halogenated hydrocarbons in preference to the unreacted unsaturated organic compounds. This discovery was surprisingly unexpected, particularly when dealing with mixtures of unsaturated hydrocarbons and of their halo-substituted products. Thus, when such a mixture is contacted, preferably in a vapor phase, with a hydrocarbon of the type of kerosene, the halo-substituted products (as well as the other halogenated by-products) are found in the solvent.

Although various types of hydrocarbons are suitable for scrubbing the halogenated compounds from the unreacted starting material, it has been found that relatively non-volatile petroleum fractions, such as kerosene, are particularly advantageous in that they are capable of recovering efficiently such halogenated products without any substantial absorption of the unreacted hydrocarbons. It is to be understood, however, that other normally liquid hydrocarbons, whether saturated or unsaturated, may also be used. Thus, isooctane and diisobutylene were found to be good for the selective solvent extraction of allyl chloride from propylene. Still other suitable hydrocarbon solvents having preferential solubility for the halogenated compounds may also be used.

Although the halo-substituted compounds produced by the reaction between the starting material and the halogen, may be substantially completely recovered according to the present invention by scrubbing the reaction mixture with the solvent for such halo-substituted compounds, it is preferable to pre-cool the mixture prior to such extraction. Such chilling causes a partial liquefaction of the halo-substituted compound, thus lowering the amount of material to be absorbed by the solvent or scrubbing medium. Furthermore, the pre-cooling of the reaction mixture is further advantageous because it has been discovered that the solvent is more selective and absorbs greater percentages of the halogenated compounds when the scrubbing or solvent extraction is effected at the lower temperatures. Thus, without any intent to be limited to the specific temperatures, the scrubbing of a propylene-allyl chloride mixture at a temperature of about 5° C. reduced the kerosene consumption approximately 60% as compared to the quantity necessary for the same type of efficient scrubbing at about 30° C. Obviously, the optimum scrubbing temperature will depend on a number of variables, such as the particular solvent used, the halo-substituted compound to be extracted, etc.

The absorbent or solvent, after scrubbing the gases and absorbing the halogenated compounds, is preferably sent to a stripping still or column for the removal of the absorbed hydrocarbons. If a relatively non-volatile petroleum absorbent oil, such as kerosene, is employed, the heating thereof will cause the vaporization of the halogenated compounds which may then be separately removed, condensed and purified in any known manner. As to the solvent, it can be returned, after proper cooling to the temperature at which the scrubbing is to be effected, back into the absorbing or scrubbing tower for further recovery and separation of new quantities of halogenated compounds. It is clear that any other method of recovering the halogenated compounds may be employed. Thus, this separation or recovery may be frequently effected by centrifuging, decanting, stratification, etc.

It is clear that if the solvent for the halo-substituted compound has a lower boiling point than the absorbed matter, the separation by heating will cause the fractional evaporation of the solvent which may then be condensed and recycled after proper chilling.

The term "relatively non-volatile petroleum absorbent oil" as used herein refers to a petroleum fraction which has substantially no vapor pressure at the temperature necessary for the distillation of the halo-substituted compound therefrom.

The present method of separation by solvent extraction or scrubbing is of particular advantage for the economic and efficient extraction of unsaturated halo-substituted and particularly the mono-halo-substituted hydrocarbons resulting from the halogenation, via substitution, of unsaturated organic compounds, such as unsaturated alkyl, aralkyl and alicyclic hydrocarbon compounds containing one or more olefinic linkages. More specifically, the present method of separation by scrubbing is especially suitable in treating mixtures resulting from the halogenation by substitution of secondary base olefinic hydrocarbons, such as propylene, $\alpha$ and $\beta$ butylene, $\alpha$ and $\beta$ amylene, etc., as well as mixtures of ethylene and vinyl halides. When these unsaturates are to be halogenated to produce halo-substituted compounds such as vinyl allyl or methyl allyl halides, the halogenating reaction is preferably effected at elevated temperatures since the higher temperatures increase the yield of unsaturated halides, while suppressing the addition of the halogen to the double bond or bonds. Usually, such halo-substitution is effected at temperatures of above 100° C., and in order to promote substitution, while inhibiting addition, it is advisable to operate between about 200° C. and 700° C., this temperature depending to a large degree on the hydrocarbon treated. However, the reaction temperature is preferably maintained below that at which polymerization and/or decomposition of the unsaturated compounds are favored under the prevailing space velocities, pressures and other operating conditions.

The molal ratio of available halogen to unsaturated compound will depend largely on the type of halogenated compound desired. Generally speaking, the higher the ratio, the higher will be the degree of halogen substitution. For the preparation of mono-chlorinated olefins for example, the molal ratio of the olefins to the chlorine should be above about 1.25:1 and preferably in the neighborhood of 3.5:1 to 5:1. However, even with such relatively great excess of the unsaturated compound over the stoichiometric requirement for reaction with the available halogen, and even when the reaction is effected under the most optimum temperature and other operating conditions favoring mono-halo-substitution, the reaction will nevertheless produce at least some other halogenated products. Thus, when propylene is caused to react with chlorine in molal ratios of about 3.5 mols of propylene per mol of chlorine, at temperatures of about 375° C. to 500° C., the resulting mixture, besides propylene, allyl chloride and some HCl, will also contain other chlorinated substances, such as 2-chlorpropene and 1-3 dichloropropene. These chlorinated substances are extracted according to the present process together with the allyl chloride, and may then be separated from the latter by any of the known methods, such as fractionation.

In order to effect the extraction of the halogenated organic compounds from mixtures thereof with the unsaturated compounds, it is necessary to maintain the mixture in a vapor state and to bring these vapors in contact with the liquid solvent or scrubbing agent described herein. When the halo-substitution reaction is effected in a continuous manner, the vapors comprising the products of reaction, it is usually preferable to provide a separate solvent treating or scrubbing zone to which the reactants may be passed continuously, preferably after proper chilling and/or HCl separation. In this scrubbing zone, the reactants may be intimately contacted with the solvent or scrubbing medium having the described preferential solubility characteristics for the halogenated bodies. In such cases resort may be made to spray treatment or countercurrent scrubbing of the mixture in empty or suitably packed towers, or the vapors may be bubbled through a body of the solvent which may be static.

The amount of solvent or scrubbing agent which will be required in any given case will be influenced by the specific solvent employed, the method of operation, the temperature at which the extraction or scrubbing is effected, the percentage of halo-substituted compounds in the reaction-mixture, etc.

As one example of a method of applying the present invention, reference may be made to the accompanying drawing which shows diagrammatically a preferred assemblage of apparatus adapted to the manufacture and separation of allyl chloride.

Propylene, or a mixture containing propylene, is continuously introduced into the system from a storage vessel not shown in the drawing. This propylene is then passed at a uniform and predetermined rate through line 10 to a preheater 11 wherein it is raised to the optimum or desired temperature. The hot gases are then conveyed through line 12 to a mixer 13, such as a mixing jet, wherein the gases are intimately commingled with chlorine gases fed through line 14. The flow of chlorine is preferably regulated so that the mixture leaving mixer 13 has a propylene-chlorine ratio of between about 3:1 and 5:1. However, it is understood that under some conditions other ratios may be found to be preferred. As a general rule, however, lower propylene-chlorine ratios are less desirable since they tend to favor the formation of undesirable chlorinated compounds, such as dichloropropene, while molal ratios above about 5:1 are without appreciable effect except insofar as they reduce the capacity of the apparatus.

The mixture of propylene and chlorine leaving mixer 13 is then conveyed relatively quickly through pipe 14' and a reaction tube 15 which may preferably be made of an acid and heat resistant material, such as Pyrex glass, stainless steel, etc. If desired, the reaction tube may also be of ordinary steel. This tube is preferably of such a volume that the average time of residence of the reactants therein is about one second. Somewhat longer reaction times may be permissible in certain cases. However, excessive residence time should be avoided because of its detrimental effect, it being realized that decomposition of allyl chloride is quite appreciable at elevated temperatures. Also, higher residence periods, such as times of 5 seconds or over, tend to increase the formation of higher chlorinated products.

After leaving the reaction tube 15, the mixture (comprises unreacted hydrocarbons, allyl chloride, hydrochloric acid, dichloropropene and 2-chlor-propene) is conveyed through pipe 16 which may be provided with adequate cooling means, such as a water cooler 17. The partially cooled mixture is then conducted at once to the bottom of a scrubbing tower 18 which may advantageously be made of tile or other material substantially resistant to the action of hydrochloric acid. The reactant mixture introduced into the bottom of this tower 18 rises therein and is simultaneously washed with water or an equivalent HCl solvent which is admitted into the upper part of the tower through line 19 and preferably provided with spraying means 20 at its discharge end within the tower. The quantity of water employed, as well as the temperature thereof, should be such that the HCl may be completely scrubbed out of the reactant mixture, without any substantial condensation of the chlorinated bodies. The aqueous hydrochloric solution thus formed is continuously or intermittently withdrawn from the system through discharge pipe 21 leading from the bottom of tower 18. This hydrochloric acid solution may be concentrated in the usual way to give a valuable by-product.

The HCl-free reactant mixture, comprising the unreacted propylene (and other unreacted hydrocarbons if the starting material introduced through line 10 was not pure propylene) and the chlorinated hydrocarbons, are then continuously withdrawn from the top of tower 18 and conveyed by means of line 22 to a cooler 23 which is preferably chilled by means of brine or butane so as to cause a partial condensation of the chlorinated unsaturates. The liquid-vapor mixture then passes through pipe 24 to a separator 25 from whence the liquefied portion may be withdrawn through line 26 while the uncondensed vapors are conveyed through lines 27 and 28 into the lower portion of an absorber 29.

In absorber 29 the uncondensed gases are scrubbed by means of the absorbing medium, such as kerosene, introduced into the upper portion of the tower through line 30. The kerosene saturated with the chlorinated hydrocarbons is withdrawn from the lower portion of tower 29 through line 31 and is conveyed to a stripping column 32 wherein the chlorinated unsaturates are vaporized, and thus separated from the absorbing medium. The unreacted propylene not absorbed in tower 29 is withdrawn from the top thereof through line 33, and may be returned back into the system, (e. g. into line 10) for further treatment and production of additional quantities of allyl chloride.

As stated, the "rich" saturated kerosene is stripped of its absorbed chlorides in stripping column 32 which is preferably provided with a reboiler or heating coil 45. The vaporized allyl chloride, 2-chlor-propene and the dichloropropene (as well as any slight quantity of propylene absorbed by the kerosene in tower 29) are withdrawn from the top of column 32, and are conveyed through line 34 to a condenser 35 wherein substantially all of the chlorinated hydrocarbons are caused to be condensed. The mixture is then conveyed through line 36 to condenser 37 from where the liquid chlorides are withdrawn through line 38, mixed with the condensate in line 26, and withdrawn from the system through line 39. This liquid predominates in allyl chloride which may be separated from the other chlorinated hydrocarbons present by any of the well known methods, such as by distillation.

The gases which have not been liquefied in condenser 35 are withdrawn from separator 37 through line 40, and may either be removed from the system through pipe 41, or, because of its content in allyl chloride, may be conveyed through line 42 and line 28 back into the absorber 29.

The kerosene, stripped of its absorbed hydrocarbons, is withdrawn through line 43 from the bottom of stripping column 32. This kerosene may be first cooled to the necessary or desirable temperature in cooler 44, and may then be continuously recycled back through line 30 for the scrubbing of further quantities of reactants passing through absorber 29. Any necessary means, such as circulating pumps, valves, etc. may be provided in line 30, as well as in the other pipes described herein.

The above described assemblage of apparatus thus provides means for the continuous manufacture and recovery of unsaturated chloro-substituted hydrocarbons, such as allyl chloride. Obviously, substantially the same assemblage may be employed for the recovery of other unsaturated halogenated or halo-substituted hydrocarbons or organic compounds from mixtures containing them.

In a specific example of operation according to the present invention, a mixture having the following approximate composition was obtained by reacting propylene with chlorine at about 500° C. to 510° C., and by scrubbing the reactants at about 50° C. to 75° C. with water to remove the HCl.

|  | Mol per cent | Weight per cent |
| --- | --- | --- |
| Propylene | 82.0 | 70.5 |
| Allyl chloride | 15.8 | 24.8 |
| 2-chlorpropene-1 | 0.4 | 0.7 |
| Dichloropropene | 1.8 | 4.0 |

This mixture was then cooled to about 7° C. to 10° C. in cooler 23, and the liquid thus obtained and withdrawn from the separator 25 through line 26 comprised about 50% by weight of the total chlorinated products present in the reaction mixture. The propylene containing the remaining unliquefied chloro-substituted product, was then conveyed at the above temperature into the scrubbing tower or absorber 29 wherein it was continuously and countercurrently scrubbed with kerosene, the ratio of the kerosene to the reactants scrubbed being maintained at about 6:1 by weight. The unreacted propylene was then withdrawn through line 33, while the enriched kerosene was heated in stripping column 32, thereby recovering substantially all of the chlorinated products, including the allyl chloride, which were not liquefied in cooler 23. After fractionation of the liquefied products withdrawn through lines 26 and 38, it was found that it was possible to recover separately about 97% of the allyl chloride present in the original reaction mixture.

While the above description discloses in some detail the preferred embodiment of the present invention and some variants thereof, it is to be understood that this is only for purposes of illustration and clarification of the invention and that this invention is not to be regarded as limited by any of the aforementioned details of operation, but is to be regarded as being coextensive with and limited only by the terms of the accompanying claims.

We claim as our invention:

1. In a process for the substantial recovery of allyl chloride from the reaction products resulting from the high temperature chlorination by substitution of propylene wherein said products of reaction contain unreacted propylene, hydrogen chloride, allyl chloride and other chlorinated compounds, the steps of cooling the products of reaction below the reaction temperature but insufficient to liquefy said products, contacting the partially cooled reaction products, while in a vapor state with water thereby dissolving the hydrogen chloride therein, separately removing said solution, further cooling the remaining reaction products to liquefy a portion of the allyl chloride and of the other chlorinated compounds, passing the remaining reaction mixture, at said relatively lower temperature, into an absorption zone maintained with sufficient kerosene to substantially absorb the remaining allyl chloride and the other chlorinated compounds, recovering said allyl chloride and the chlorinated products from said kerosene, and separately recovering the allyl chloride.

2. In a process for the substantial recovery of allyl chloride from the reaction products resulting from the high temperature chlorination by substitution of propylene, wherein said products of reaction include unreacted propylene allyl chloride and hydrogen chloride, the steps of cooling the products of reaction below the reaction temperature but insufficient to liquefy same, contacting said partially cooled reaction mixture, while in a vapor state, with a scrubbing agent for the hydrogen chloride, removing the solution thus produced, contacting the remaining vapors with kerosene to substantially absorb the allyl chloride, while the unreacted propylene is allowed to remain undissolved, and recovering the allyl chloride from its solution in said kerosene.

3. In a process for the recovery of allyl chloride from the reaction mixture resulting from the high temperature chlorination by substitution of propylene, wherein said reaction mixture includes allyl chloride, unreacted propylene and hydrogen chloride, the steps of cooling the reaction mixture to a temperature below the reaction temperature but above the liquefaction temperature of the constituents of the mixture, contacting the cooled vapor mixture with a selective solvent for the hydrogen chloride to remove hydrogen chloride therefrom, contacting the remainder of the vapor mixture with a liquid hydrocarbon of the group consisting of kerosene, iso-octane and diisobutylene, thereby selectively dissolving the allyl chloride, and recovering the allyl chloride from its solution in the liquid solvent.

4. In a process for the recovery of allyl chloride from a mixture comprising allyl chloride and propylene, the steps which comprise contacting the mixture with a liquid hydrocarbon of the group consisting of kerosene, iso-octane and diisobutylene, thereby selectively dissolving the allyl chloride, and recovering the allyl chloride from its solution in the liquid solvent.

5. In a process for the recovery of allyl chloride from a mixture comprising allyl chloride and propylene, the steps which comprise contacting the mixture with kerosene, thereby selectively dissolving the allyl chloride, and recovering the allyl chloride from its solution in the kerosene.

6. In a process for the recovery of an allyl halide of the group consisting of allyl chloride and allyl bromide from a mixture comprising it and propylene, the step which comprises selectively dissolving the allyl halide from the mixture by contacting the mixture with a liquid hydrocarbon of the group consisting of kerosene, iso-octane and diisobutylene.

7. In a process for the recovery of an allyl halide of the group consisting of allyl chloride and allyl bromide from a mixture comprising it and propylene, the step which comprises selectively dissolving the allyl halide from the mixture by contacting the mixture with kerosene.

8. In a process for the recovery of an unsaturated halide from a mixture comprising the unsaturated halide and an olefin, and resulting from the reaction, by substitution, of the olefin with a halogen of the group consisting of chlorine and bromine, the step which comprises selectively dissolving the unsaturated halide from the mixture by contacting the mixture with a liquid hydrocarbon of the group consisting of kerosene, iso-octane and diisobutylene.

9. In a process for the recovery of an unsaturated halide from a mixture comprising the unsaturated halide and an olefin, and resulting from the reaction, by substitution, of the olefin with a halogen of the group consisting of chlorine and bromine, the step which comprises selectively dissolving the unsaturated halide from the mixture by contacting the mixture with kerosene.

10. In a process for the recovery of an unsaturated halide from a mixture comprising the unsaturated halide and an unsaturated hydrocarbon containing an olefinic linkage between two carbon atoms of aliphatic character, said mixture resulting from the reaction, by substitution, of the olefinic unsaturated hydrocarbon with a halogen of the group consisting of chlorine and bromine, the step which comprises selectively dissolving the unsaturated halide from the mixture by contacting the mixture with a liquid hydrocarbon of the group consisting of kerosene, iso-octane and diisobutylene.

11. In a process for the recovery of an unsaturated halide from a mixture comprising the unsaturated halide and an unsaturated hydrocarbon containing an olefinic linkage between two carbon atoms of aliphatic character, said mixture resulting from the reaction, by substitution, of the olefinic unsaturated hydrocarbon with a halogen of the group consisting of chlorine and bromine, the step which comprises selectively dissolving the unsaturated halide from the mixture by contacting the mixture with kerosene.

WILLIAM ENGS.
SIMON N. WIK.